Figure 1:
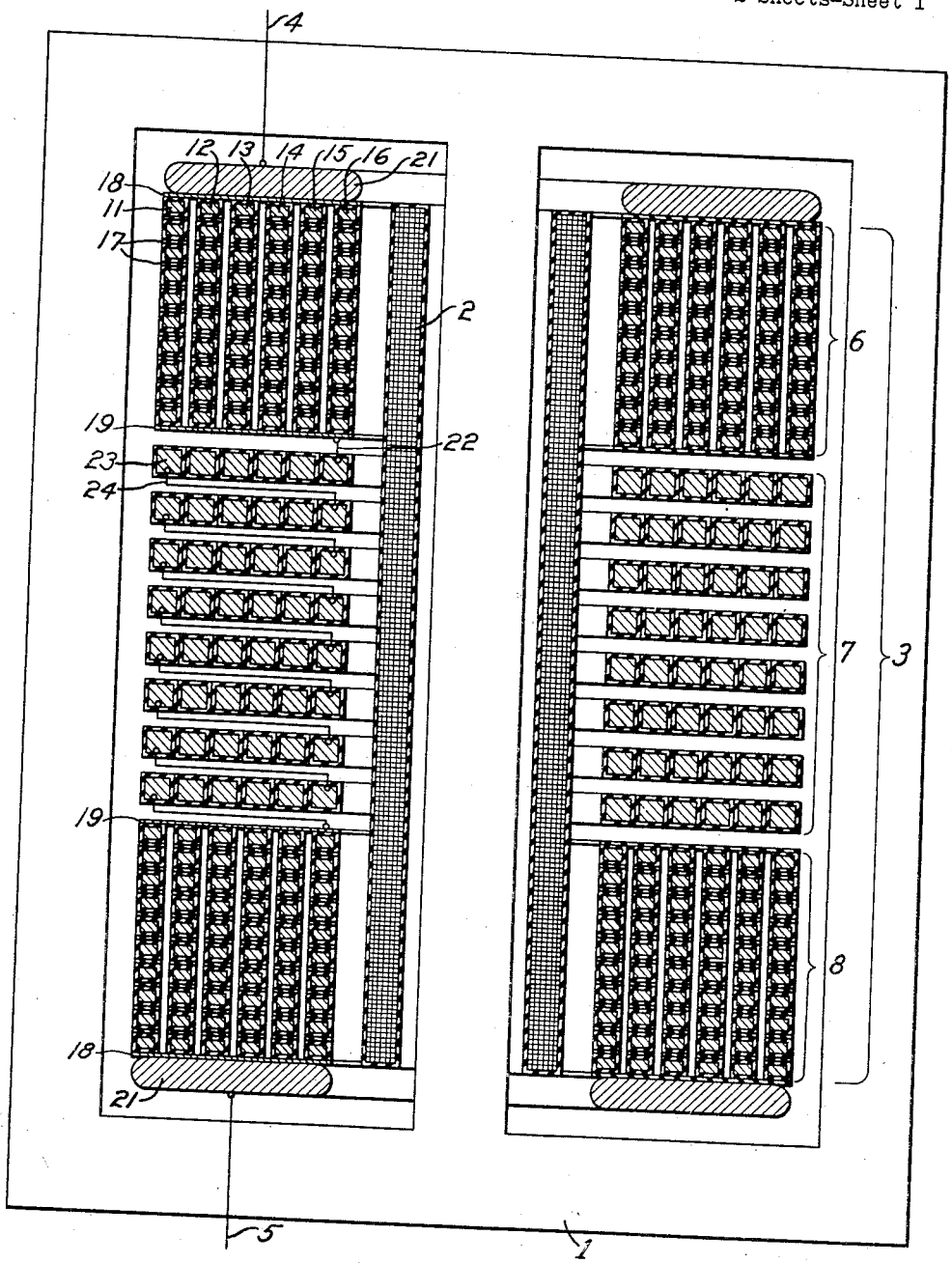

May 4, 1943.   R. ELSNER ET AL   2,318,068
ELECTRICAL WINDING
Filed Sept. 7, 1939   2 Sheets-Sheet 1

WITNESSES:
Wm. B. Sellers.
Thos. C. Groome

INVENTORS
Richard Elsner and
Joseph Rebhan.
BY Franklin E. Hardy
ATTORNEY

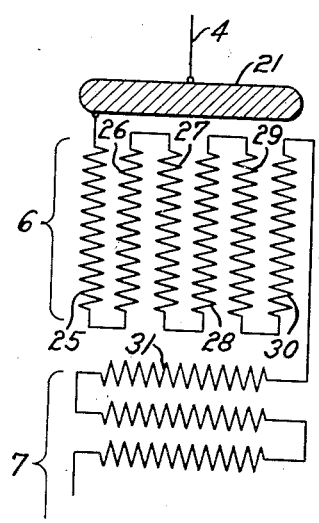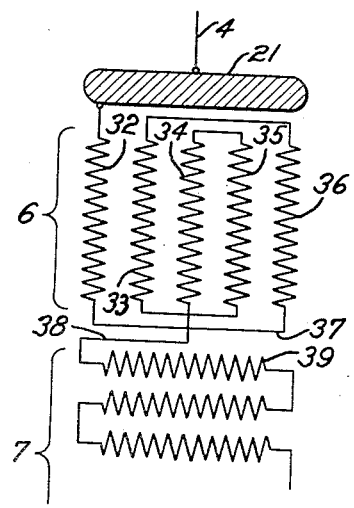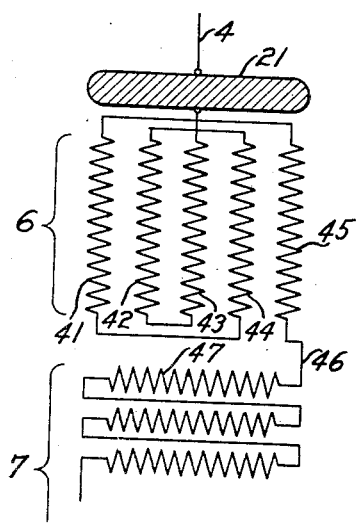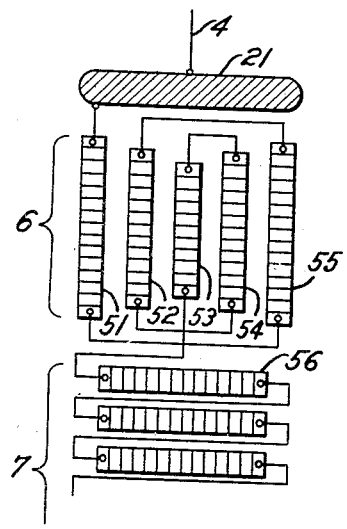

Patented May 4, 1943

2,318,068

UNITED STATES PATENT OFFICE 2,318,068

ELECTRICAL WINDING

Richard Elsner and Joseph Rebhan, Nuremberg, Germany, assignors to Westinghouse Electric & Manufacturing Company, East Pittsburgh, Pa., a corporation of Pennsylvania Application September 7, 1939, Serial No. 293,682
In Germany October 18, 1938

8 Claims. (Cl. 175—356)

The present invention relates to windings for electrical apparatus, such as transformers, reactors and the like. It is well known that when a transformer is equipped with a winding of one of the usual types formed either of a plurality of cylindrical layers of winding turns or of disc-shaped coils, the end of the winding that is connected to the incoming power line conductor may be seriously damaged by surge voltages entering the winding from the power circuit conductor. It has been proposed to reduce the voltage stresses to which the end turns of the winding are subjected by the use of electrostatic shields. Such shields, however, require considerable space, since they are connected to the high voltage terminal of the winding and must, therefore, be insulated for the full high voltage to ground and also from the windings having a different potential. Such electrostatic shields have no active part in the process of transforming electric power.

It is an object of the invention to provide a winding arrangement that is effectively protected against traveling voltage waves or surge voltages without resorting to the use of electrostatic shields.

It is a further object of the invention to provide a tubular-shaped winding, the main or central portion of which is formed of a plurality of disc-shaped coils and the end portions of which are formed of a plurality of one-layer cylindrical coils.

Other objects and advantages of the invention will be apparent from the following description of certain preferred embodiments thereof, reference being had to the accompanying drawings, in which Figure 1 is a sectional view of a transformer illustrating one preferred embodiment of the invention; and Figs. 2 to 5 are diagrammatic views illustrating portions of windings of several modifications of the winding arrangement illustrated in Figure 1.

Referring to Figure 1 of the drawings, a core structure 1 is illustrated having three vertical members, the central one of which serves as a winding leg for the transformer windings and about which a low voltage winding 2 and a high voltage winding 3 are positioned. A high voltage terminal conductor 4 is connected to one end of the high voltage winding 3 and a terminal conductor 5 is connected to the other end of the winding and may be connected either to the neutral or star point of a grounded system or to another phase conductor of the system in accordance with well known practice. The low voltage winding 2 is shown as located adjacent the winding leg of the iron-core within the high voltage winding, although it may be divided into two portions, one of which surrounds the high voltage winding.

The high voltage winding 3 is divided into three sections 6, 7 and 8, the end sections 6 and 8 being similar in construction and composed of a plurality of one-layer coils 11, 12, 13, 14, 15 and 16, arranged concentrically with respect to one another. The individual coils may be directly in engagement with adjacent coils or may be separated by a clearance space 17, as illustrated, through which cooling fluid is permitted to circulate. In Fig. 1, the several coils 11 to 16 are connected in parallel between conducting buses or bars 18 and 19, the bus 18 being connected to a protective ring or "static plate" 21, which is used for the purpose of preventing corona discharge. The ring 21 is connected to the high voltage line conductor 4 and the opposite end of the section 6 or the bus 19 is connected by a conductor 22 to the first of a plurality of disc-type coils 23 which make up the main or central section 7 of the high voltage winding. The several coils 23 are connected together in any desired manner, such as by the conductors 24.

The end section 8 of the winding may be arranged in a manner similar to section 6, and this is particularly desirable in those cases where the possibility exists that surge voltages may enter either end section of the winding from without, as when the conductor 5 is connected either to an isolated neutral or star point of a three-phase system or to another phase conductor of the system.

The helically wound conductors constituting the cylindrical one-layer coils 11 to 16 may be either round copper wire or wire of other suitable cross section. In the drawings, the copper conductors are illustrated as being rectangular in cross section and so arranged that the longer sides of the rectangular cross section areas are parallel to each other and the short sides face the core or low voltage winding and the tank wall in which the apparatus is normally positioned. With this arrangement, the turn-to-turn capacitance between the conductors of the end section will be considerably increased. It will be noted by reference to Fig. 1 that if the conductors have a square or a circular cross section, the conductor surfaces of adjacent turns are facing each other several times while the same conductor surface of the single conductor of one turn is facing the core only once. Further, the distance between the winding and the core is much greater than the distance between adjacent winding turns so that it will be readily seen that the capacitance between the turn-to-turn conductors and between the parallel connected one-layer coils will be much greater than the capacitance from a turn or from a coil to ground, and that because of this relationship the distribution of a surge voltage along the individual turns will be fairly uniform. As a result of this uniform distribution, the conductors of the end sections 6 and 8 require much less insulation than that required for the conventional winding made up entirely of a plurality of disc-shaped coils.

It is practicable to connect the individual coils of the end sections 6 and 8 of the winding together in other arrangements. For example, the several coils 11 to 16 may be connected in series or in series-parallel. In the latter case, groups of series-connected one-layer coils are first formed and these groups connected in parallel.

Referring to Fig. 2, a portion of a high voltage winding of a transformer similar to that illustrated in Fig. 1 is shown, in which the end section 6 is made up of a plurality of one-layer cylindrical coils 25 to 30, inclusive, similar in construction to the coils 11 to 16, shown in Fig. 1, except that they are all connected in series, the coil 25 of highest voltage being connected to the static plate 21 and conductor 4 and the coil 30 of lowest voltage being connected to a disc coil 31 which is the first one of a plurality of disc coils that are similar in construction to the coils 23, shown in Fig. 1.

The arrangements shown in Figs. 3 and 4 are structurally similar to that shown in Fig. 2, in that a plurality of cylindrical coils 32 to 36 or 41 to 45 are provided which, together, form the end section of the winding. These coils are, however, so connected together in the arrangement shown in Fig. 3 that the alternate outer coils 32 and 36 are directly connected by conductor 37, and the inner pair of coils 33 and 35 similarly connected in series, so that a gradual drop in high voltage potential from the outside layers of coils occurs toward the center layer 34, which coil is connected by a conductor 38 to a winding 39 forming the first disc coil of the central section 7.

In Fig. 4, the arrangement is similar to that shown in Fig. 3, the several one-layer cylindrical coils 41 to 45 being arranged as in Fig. 1, but connected in a reverse relation to the manner shown in Fig. 3, the central winding 43 being connected to the terminal conductor 4 and the several remaining pairs of coils being connected in series in such relation that the voltage decreases gradually from the center of the winding toward the outside layers, the last layer 45 being connected by conductor 46 to the first disc coil 47 of the central section 7.

In Fig. 5, an arrangement of the coils is similar to that shown in Fig. 3, with the exception that the cylindrical coils 51 to 55 are of varying lengths causing their ends to be spaced in steps from the protective ring or static plate 21. The outer coils 51 and 55 are shown as the longest while the center coil 53 is the shortest, and the remaining coils 52 and 54 are of intermediate length.

It is desirable that the passage from the surge-proof end sections of the winding into the central winding section of normal design shall be as gradual as possible. This is done by grading the inductances of the coils in an appropriate manner by varying the number of turns of adjacent coils in properly chosen steps. For example, in the arrangement shown in Fig. 5, the one-layer coil 53 should have about the same number of turns as the first disc-shaped coil 56 of the section 7 to which the coil 53 is connected and the number of turns of the adjacent disc-shaped coils below the coil 56 should not differ from one another by too great an amount.

Many modifications within the spirit of our invention will be apparent to those skilled in the art and we do not wish to be limited other than by the scope of the appended claims.

We claim as our invention:

1. An electrical winding having a main section formed of a plurality of relatively wide thin disc-shaped coils electrically connected together and an end section formed of a plurality of relatively high thin concentrically arranged cylindrical coils connected in parallel, the several coils being wound about the same axis, the different sections being positioned about different parts of the axis.

2. An electrical winding having a main section formed of a plurality of disc-shaped coils electrically connected together and an end section formed of a plurality of concentrically arranged cylindrical one-layer coils connected in series and characterized in that the cylindrical coil of highest potential is positioned between other cylindrical coils of the section.

3. An electrical winding having a main section formed of disc-shaped coils electrically connected together and an end section formed of a plurality of concentrically arranged cylindrical one-layer coils connected in series and characterized in that the cylindrical coil of the section having the lowest potential is positioned between other cylindrical coils of the section.

4. An electrical winding having a main section formed of a plurality of one-layer disc-shaped coils electrically connected together and a surge-proof end section formed of a plurality of cylindrical one-layer coils connected to each other and to the coils of the main section, characterized in that the capacitance between the turns of the end section and between the coils of the end section is higher than the capacitance to ground between these turns and coils.

5. A tubular shaped electrical winding having a main section centrally thereof formed of a plurality of disc-shaped coils electrically connected together and end sections formed of a plurality of cylindrical one-layer coils connected to each other between the coils of the main section and the winding terminal, the several coils of the several sections being wound about a common axis, the end sections being positioned along the axis on opposite sides of the main section.

6. An electrical winding having a main section formed of a plurality of relatively wide thin disc-shaped coils positioned about a common axis and electrically connected together and an end section formed of a plurality of relatively high thin concentrically arranged coils connected in series and characterized in that the cylindrical coil constituting one terminal coil of the end section is positioned between the other cylindrical coils of the section and that the coils of the section next adjacent this terminal coil are connected between the said terminal coil of the section and the remaining coils of the section.

7. An electrical winding having a main section comprising a series of layers of turns stacked about a common axis, the consecutive turns of each layer extending radially from the axis and a surge-proof end section comprising a plurality of concentric layers of turns positioned about the common axis, the consecutive turns of each layer having the same radius as the other turns of the layer to form a cylindrical group of turns.

8. An electrical winding having a main section formed of a plurality of relatively wide thin disc-shaped coils electrically connected together and an end section formed of a plurality of relatively high thin concentrically arranged cylindrical coils connected in series, the several coils being wound about the same axis, the different sections being positioned about different parts of the axis.

RICHARD ELSNER.
JOSEPH REBHAN.